United States Patent
Sweet et al.

(10) Patent No.: US 11,999,866 B2
(45) Date of Patent: Jun. 4, 2024

(54) POLYMALONATE AND CYANOACRYLATE BASED SURFACE CONCRETE SEALERS

(71) Applicant: Zephyros, Inc., Romeo, MI (US)

(72) Inventors: David Sweet, Romeo, MI (US); Michael Czaplicki, Romeo, MI (US); Ken Mazich, Romeo, MI (US); Yuan Lu, Romeo, MI (US); Kevin Hicks, Romeo, MI (US); Austin O'Connor, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 791 days.

(21) Appl. No.: 16/334,501

(22) PCT Filed: Sep. 19, 2017

(86) PCT No.: PCT/US2017/052122
§ 371 (c)(1),
(2) Date: Mar. 19, 2019

(87) PCT Pub. No.: WO2018/053454
PCT Pub. Date: Mar. 22, 2018

(65) Prior Publication Data
US 2021/0324227 A1 Oct. 21, 2021

Related U.S. Application Data

(60) Provisional application No. 62/396,600, filed on Sep. 19, 2016.

(51) Int. Cl.
*C04B 41/48* (2006.01)
*C09D 171/00* (2006.01)

(52) U.S. Cl.
CPC ........ *C09D 171/00* (2013.01); *C04B 41/4884* (2013.01); *C04B 41/4896* (2013.01)

(58) Field of Classification Search
CPC .............. C04B 41/4884; C04B 41/4896
See application file for complete search history.

(56) References Cited

U.S. PATENT DOCUMENTS

| | | | |
|---|---|---|---|
| 4,160,864 A | 7/1979 | Ponticello | |
| 5,576,065 A * | 11/1996 | Gaveske | E04B 1/66 156/71 |
| 8,609,885 B2 | 12/2013 | Maolfsky | |
| 8,884,051 B2 | 11/2014 | Malofsky et al. | |
| 9,181,365 B2 | 11/2015 | Malofsky | |
| 9,217,098 B1 | 12/2015 | Stevenson et al. | |
| 9,528,029 B2 * | 12/2016 | Sobczak | C09D 201/02 |
| 2006/0080935 A1 * | 4/2006 | Ddamulira | C09D 125/02 52/741.4 |
| 2012/0252934 A1 * | 10/2012 | Miller | C04B 28/02 524/2 |
| 2014/0329980 A1 | 11/2014 | Malofsky et al. | |
| 2015/0056879 A1 | 2/2015 | Malofsky | |
| 2015/0073110 A1 * | 3/2015 | Malofsky | C08F 22/14 526/204 |
| 2016/0244635 A1 * | 8/2016 | Wouldhave | C08G 18/603 |
| 2019/0161620 A1 * | 5/2019 | Zalich | C09C 3/10 |

FOREIGN PATENT DOCUMENTS

| | | |
|---|---|---|
| DE | 29824332 U1 | 1/2001 |
| EP | 2993211 A1 | 3/2016 |
| JP | 2009/028668 A | 2/2009 |
| JP | 2009028668 A | 2/2009 |
| WO | 2013/149165 A1 | 10/2013 |
| WO | 2013/149168 A1 | 10/2013 |
| WO | 2014/078689 A1 | 5/2014 |
| WO | 2017/184986 A | 10/2017 |
| WO | 2017/184986 A1 | 10/2017 |

OTHER PUBLICATIONS

PCT Search Report & Written Opinion dated Sep. 27, 2018, Application No. PCT/US2017/028853.
PCT Search Report & Written Opinion dated Nov. 6, 2017, Application No. PCT/US2017/052254.
European First Communication dated Nov. 20, 2020, Application No. 17788331.1.
PCT Search Report & Written Opinion dated Dec. 15, 2017, Application No. PCT/US2017/052122.
Chinese First Office Action dated Nov. 4, 2020, Application No. 201780064014.1.
Polymer Chemistry, 1st Ed., Yu Xuehai et al., Nanjing University Press, p. 168, Nov. 30, 1994.
Chinese Abstract of the Second Office Action dated Jun. 29, 2021, Application No. 201780064014.1.
European Communication Pursuant to Article 94(3) EPC dated Oct. 20, 2021, Application No. 17788331.1.
Chinese Search Report dated Jun. 23, 2021, Application No. 2017800640141.
Chinese Decision of Rejection dated Nov. 19, 2021, Application No. 201780064014.1.

* cited by examiner

*Primary Examiner* — Alex B Efta
(74) *Attorney, Agent, or Firm* — The Dobrusin Law Firm, PC

(57) ABSTRACT

The present teachings contemplate a method for sealing comprising providing a substrate that includes a plurality of pores, locating a polymerizable composition onto a surface of the substrate, the polymerizable composition including a monofunctional, difunctional or multifunctional methylene malonate or a cyanoacrylate, and initiating polymerization of the composition, wherein polymerization is initiated by the use of an initiator or by the presence of a latent activating agent.

17 Claims, No Drawings

POLYMALONATE AND CYANOACRYLATE BASED SURFACE CONCRETE SEALERS

TECHNICAL FIELD

The present invention relates generally to surface sealing compositions, and more specifically to sealing compositions for sealing concrete surfaces.

BACKGROUND

In the construction industry, among others, concrete and other similar materials are frequently utilized. However, concrete can be easily damaged by many processes, such as the expansion of corrosion products of steel reinforcement bars located within the concrete, the freezing of trapped water, fire or radiant heat, aggregate expansion, sea water effects, bacterial corrosion, leaching, erosion by water and other physical and chemical damage. It would therefore be desirable to provide a concrete coating that would prevent one or more of these issues.

U.S. Pat. Nos. 8,609,885; 8,884,051; and 9,181,365 and U.S. Publication Nos. 2014/0329980 and 2015/0056879 may be relevant to the present teachings, and are all incorporated by reference for all purposes.

Notwithstanding the above teachings, there remains a need for a concrete sealing composition that quickly polymerizes so that it is easily integrated into the construction process.

SUMMARY OF THE INVENTION

One or more of the above needs are met by the present teachings which contemplate a method for sealing comprising providing a substrate that includes a plurality of pores, locating a polymerizable composition onto a surface of the substrate, the polymerizable composition including a monofunctional, difunctional or multifunctional methylene malonate or a cyanoacrylate, and initiating polymerization of the composition. Polymerization may be initiated by the use of an initiator or by the presence of a latent activating agent.

The substrate may be selected from concrete, stucco, brick, or combinations thereof. The composition may include an additive to increase the glass transition temperature of the composition. The method may include sealing the plurality of pores with the composition to prevent collection of liquid in one or more of the plurality of pores. Polymerization may take place in less than 2 hours, less than 1 hour, or even less than 30 minutes after initiating. The composition may be substantially transparent after polymerization. Polymerization may be anionic. The composition may be selected from diethyl methylene malonate (DEMM), dimethyl methylenemalonate (DMMM), di-n-propyl methylene malonate, di-isopropyl methylene malonate, dibenzyl methylene malonate, methylene β-ketoesters, methylene β-diketones, methyl-2-cyanoacrylate, ethyl-2-cyanoacrylate, n-butyl cyanoacrylate, 2-octyl cyanoacrylate, and combinations thereof. The composition has a glass transition temperature of at least about 50° C.

The composition may include a malonate component and a cyanoacrylate component. The composition may be free of any cyanoacrylate component. The composition may be free of any malonate component. The composition may increase the hydrophobicity of the substrate by at least about 5%, at least about 10%, at least about 15%, or even at least about 20%. The composition may decrease the water absorption of the substrate by at least about 5%, at least about 10%, at least about 15%, or even at least about 20%. The composition may include fumed silica, polymethylmethacrylate (PMMA), sulfonated polymers, carboxylated polymers, polymer fibers, surface modified silica or combinations thereof.

The method may include rolling, brushing or spraying the composition onto the substrate. The method may include mixing the composition into the substrate prior to solidification of the substrate.

The composition may be substantially free of any curing agent. The composition may polymerize upon the application of ultra violet light. The composition may polymerize upon the application of heat. The composition may polymerize at ambient temperatures with no additional stimulus, but may polymerize more quickly with the addition of a stimulus.

The teachings herein further provide for use of the method of any of the preceding claims for sealing concrete.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/396,600, filed Sep. 19, 2016, the contents of that application being hereby incorporated by reference for all purposes.

The present teachings contemplate the use of a monomeric composition for coating porous substrates. The monomeric composition may be a one part material that polymerizes either immediately or at some later designated time at room temperature. It is quite possible that the monomeric composition polymerizes at room temperature without the addition of any initiator or stimulus. However, it is also possible that an initiator or stimulus may be utilized to cause polymerization of the composition. The composition may be such that the time of polymerization can be modified so that it is "on demand". In other words, the composition can be applied as a coating to a secondary material and provide sufficient open time for application of the coating with no polymerization such that the composition does not polymerize until contact with a stimulus or surface a choice. Thus, open time for the application process can extend a number of minutes or even an hour without fear of early polymerization. It is possible that only contact with certain substrates initiates polymerization of the composition.

The composition may provide one or more of the following benefits. The composition may form a tack-free surface. The composition may undergo polymerization at room temperature with no additional initiator or stimulus. The composition may polymerize is less than 1 hour so that it is suitable for use in a building construction environment.

The composition may be applied directly to a concrete or other porous material. Polymerization may occur in less than 60 minutes after application or even less than 30 minutes after application. It is also possible that that the composition may polymerize via electropolymerization, mechanically initiated polymerization, dual cure polymerization, thermally initiated polymerization, coordination polymerization, or nucleophilic polymerization. The composition may undergo solution or emulsion polymerization. It is also possible that the composition undergoes random copolymerization or block copolymerization.

It is possible that an additive may be included in the composition to impart toughness, to increase glass transition temperature or to increase viscosity of the composition. In order to obtain an adhesive composition with sufficient viscosity to be applied in a desired location without significant dripping, a viscosity modifying agent may be supplied. The viscosity modifying agent may be selected from one or more filler materials, which may be selected from fumed silica, polymethylmethacrylate (PMMA), sulfonated polymers, carboxylated polymers, polymer fibers, surface modified silica and combinations thereof.

The substrate may be any porous substrate (e.g., may have a plurality of pores). The substrate may be selected from concrete, stucco, brick, or combinations thereof. The composition may have the effect of sealing the plurality of pores to prevent collection of liquid in one or more of the plurality of pores. Such sealing may improve the hydrophobicity of the substrate and also reduce the amount of water absorbed by the substrate. The composition may further act as a corrosion inhibitor.

The composition may be uniquely formulated so that it polymerizes quickly as required for its selected use. Not only may the composition be capable of fast polymerization, but the polymerization may occur more or less quickly by the addition or removal of a stimulus, so that polymerization may be on-demand. Polymerization may take place in less than 2 hours, less than 1 hour, or even less than 30 minutes after initiating. The composition may be formed to be substantially transparent after polymerization so that the surface of the substrate is unaffected. The composition may alternatively include a pigment to provide desired coloring of the substrate.

The composition may be rolled, brushed or sprayed onto the substrate. The composition may be mixed into the substrate prior to solidification of the substrate.

Unlike many coatings, the composition may be free of a curing agent. The inherent nature of the malonate or cyanoacrylate may facilitate polymerization without the need for additional chemical components to initiate polymerization. It is also possible that the composition polymerizes when exposed to a selected stimulus. The composition may polymerize upon the application of ultra violet light. The composition may polymerize upon the application of heat. The composition may polymerize at ambient temperatures with no additional stimulus, but may polymerize more quickly with the addition of a stimulus.

The compositions herein may be utilized at a construction site for coating any construction material that is porous and subject to damage my water, corrosion, salt, or other materials that are likely to enter and/or damage the pores of the substrate.

As used herein, unless otherwise stated, the teachings envision that any member of a genus (list) may be excluded from the genus; and/or any member of a Markush grouping may be excluded from the grouping. Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for sealing comprising:
   providing a substrate that includes a plurality of pores;

locating a polymerizable composition onto a surface of the substrate, the polymerizable composition selected from the group consisting of monofunctional, difunctional or multifunctional methylene malonates, cyanoacrylates, or any combination thereof;

initiating polymerization of the composition only upon contact of the composition with the surface of the substrate;

wherein polymerization is initiated by the use of an initiator or by the presence of a latent activating agent.

2. The method of claim 1, wherein the substrate is selected from concrete, stucco, brick, or combinations thereof.

3. The method of claim 1, including sealing the plurality of pores with the composition to prevent collection of liquid in one or more of the plurality of pores.

4. The method of claim 1, wherein polymerization takes place less than 30 minutes after initiating.

5. The method of claim 4, wherein the composition is substantially transparent after polymerization.

6. The method of claim 1, wherein polymerization is anionic.

7. The method of claim 2, wherein the composition is selected from diethyl methylene malonate (DEMM), dimethyl methylenemalonate (DMMM), di-n-propyl methylene malonate, di-isopropyl methylene malonate, dibenzyl methylene malonate, methyl-2-cyanoacrylate, ethyl-2-cyanoacrylate, n-butyl cyanoacrylate, 2-octyl cyanoacrylate, and combinations thereof.

8. The method of claim 1, wherein the composition has a glass transition temperature of at least about 50° C.

9. The method of claim 2, wherein the composition includes a malonate component and a cyanoacrylate component.

10. The method of claim 1, wherein the composition is free of any cyanoacrylate component.

11. The method of claim 1, wherein the composition is free of any malonate component.

12. The method of claim 7, wherein the composition increases the hydrophobicity of the substrate by at least about 10%.

13. The method of claim 12, wherein the composition decreases the water absorption of the substrate by at least about 10%.

14. The method of claim 1 including rolling, brushing or spraying the composition onto the substrate.

15. The method of claim 1, wherein the composition is free of any curing agent.

16. The method of claim 2, wherein the composition polymerizes upon the application of ultra violet light.

17. The method of claim 1, wherein the composition polymerizes upon the application of heat.

\* \* \* \* \*